US011906923B2

(12) United States Patent
Katahira et al.

(10) Patent No.: US 11,906,923 B2
(45) Date of Patent: Feb. 20, 2024

(54) IMAGE FORMING APPARATUS

(71) Applicant: CANON KABUSHIKI KAISHA, Tokyo (JP)

(72) Inventors: Ko Katahira, Kanagawa (JP); Keita Nakajima, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/932,618

(22) Filed: Sep. 15, 2022

(65) Prior Publication Data

US 2023/0088254 A1 Mar. 23, 2023

(30) Foreign Application Priority Data

Sep. 21, 2021 (JP) ................................ 2021-152861

(51) Int. Cl.
*G03G 15/00* (2006.01)

(52) U.S. Cl.
CPC ..... *G03G 15/6552* (2013.01); *G03G 15/5016* (2013.01); *G03G 2215/00421* (2013.01); *G03G 2215/00911* (2013.01)

(58) Field of Classification Search
CPC ........... G03G 15/6552; G03G 15/5016; G03G 2215/00421; G03G 2215/00911
See application file for complete search history.

(56) References Cited

U.S. PATENT DOCUMENTS

2021/0061608 A1* 3/2021 Fujiwara ................ B65H 31/00

FOREIGN PATENT DOCUMENTS

| | | | |
|---|---|---|---|
| JP | 2007-124461 | A | 5/2007 |
| JP | 2010-033042 | A | 2/2010 |
| JP | 6341975 | B2 | 6/2018 |
| JP | 6398307 | B2 | 10/2018 |

* cited by examiner

*Primary Examiner* — Mark R Gaworecki
(74) *Attorney, Agent, or Firm* — Canon U.S.A., Inc. I.P. Division

(57) ABSTRACT

An image forming apparatus includes an upper guide unit fixed to the image forming apparatus and configured to guide an upper surface of the sheet discharged by a roller pair, a stack unit provided at a position recessed from an upper exterior unit of the image forming apparatus, and an operation unit including a display unit. The discharged sheets are stacked on the stack unit. The upper guide unit extends more to a downstream side in the discharge direction than the roller pair. The operation unit and the upper guide unit each have a portion overlapping with each other. When viewed in an axial direction of the roller pair, the operation unit and the upper guide unit are arranged at positions through which a straight line orthogonal to a plane passing through axes of rollers of the roller pair and passing through a nip portion of the roller pair passes.

11 Claims, 17 Drawing Sheets

IMAGE FORMING APPARATUS

BACKGROUND OF THE INVENTION

Field of the Invention

The present invention relates to an image forming apparatus for forming an image on a sheet.

Description of the Related Art

Some image forming apparatuses such as a printer and a facsimile are provided with an operation unit configured to display information to a user or allow the user to operate the apparatus. The operation unit is arranged in the image forming apparatus at a position outside a sheet stack unit in a sheet width direction orthogonal to a sheet discharging direction so that the operation unit does not come into contact with a discharged sheet. Further, from a viewpoint of a size and design of the image forming apparatus and prevention of damage, it is desirable that the operation unit does not protrude from a side surface of the apparatus.

On the other hand, in a case where the size of the operation unit is to be increased for a purpose of increasing an amount of information displayed on the operation unit, adopting a touch panel, or the like to improve usability, the operation unit tends to be large. In a case where an operation unit having a large size is provided in such a way that the operation unit does not protrude from a side surface of the apparatus, it may be difficult to arrange the operation unit outside the sheet stack unit. That is, in the width direction of the sheet, the operation unit may protrude directly above the sheet stack unit.

Accordingly, Japanese Patent No. 06341975 discusses a configuration so that an arm unit configured to connect an upper portion of the image forming apparatus and the operation unit is arranged in the image forming apparatus so that even in a case where the operation unit is arranged in the upper portion of the stack unit, the operation unit does not come into contact with the discharged sheet. According to Japanese Patent No. 06341975, the arm unit is rotatable with respect to a main body of the apparatus, and by rotating the arm unit, the operation unit secures a distance from the sheet to be discharged.

Japanese Patent No. 06398307 discusses a technique in which a rotation locus of the operation unit is arranged above a paper ejection locus of the discharged sheet. According to Japanese Patent No. 06398307, the operation unit is arranged at a position at which the operation unit is not in contact with the discharged sheet.

According to the methods discussed in Japanese Patent No. 06341975 and Japanese Patent No. 06398307, however, the arm unit and the operation unit are located at positions apart from the main body of the apparatus, and as a result, the image forming apparatus is increased in size.

SUMMARY OF THE INVENTION

According to an aspect of the present invention, an image forming apparatus including an image forming unit configured to form an image on a sheet includes a roller pair configured to convey the sheet on which the image is formed and discharge at least a part of the sheet to the outside of the image formation apparatus, an upper guide unit fixed to the image forming apparatus and configured to guide an upper surface of the sheet discharged by the roller pair, a stack unit provided at a position recessed from an upper exterior unit of the image forming apparatus, the discharged sheet being stacked on the stack unit, and an operation unit including a display unit configured to display information regarding image forming processing, the operation unit being attached to the upper exterior unit of the image forming apparatus, the operation unit being configured to operate the image forming apparatus, wherein the upper guide unit extends, along a discharge direction of the sheet by the roller pair, more to a downstream side in the discharge direction than the roller pair, wherein the operation unit and the upper guide unit each have a portion overlapping with each other when viewed in a vertical direction, and wherein, when viewed in an axial direction of the roller pair, the operation unit and the upper guide unit are arranged at positions through which a straight line that is orthogonal to a plane passing through axes of rollers of the roller pair and that passes through a nip portion of the roller pair passes.

Further features of the present invention will become apparent from the following description of exemplary embodiments with reference to the attached drawings.

DESCRIPTION OF THE EMBODIMENTS

As an example of the configuration of the image forming apparatus configured to form an image on a sheet according to a first exemplary embodiment of the present invention, an exemplary embodiment in a case where the image forming apparatus is applied to an electrophotographic laser beam printer will be specifically described. As the order of explanation, an overall configuration of the image forming apparatus according to the present exemplary embodiment will be described first, and then a configuration of a sheet discharge unit of the image forming apparatus according to the present exemplary embodiment will be described.

Figure 1:
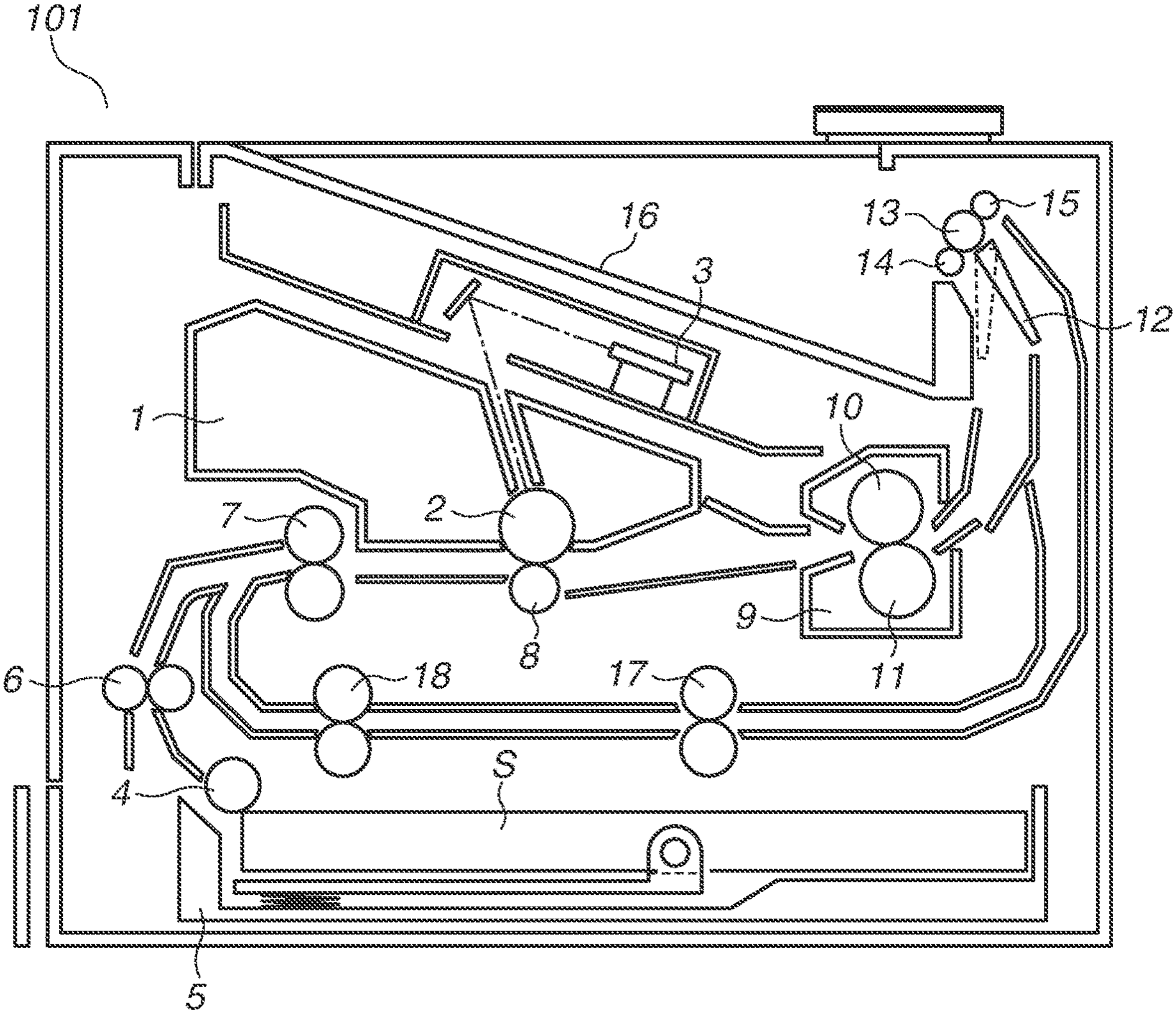
FIG. 1 is a schematic view of an image forming apparatus according to a first exemplary embodiment.
Figure 2:
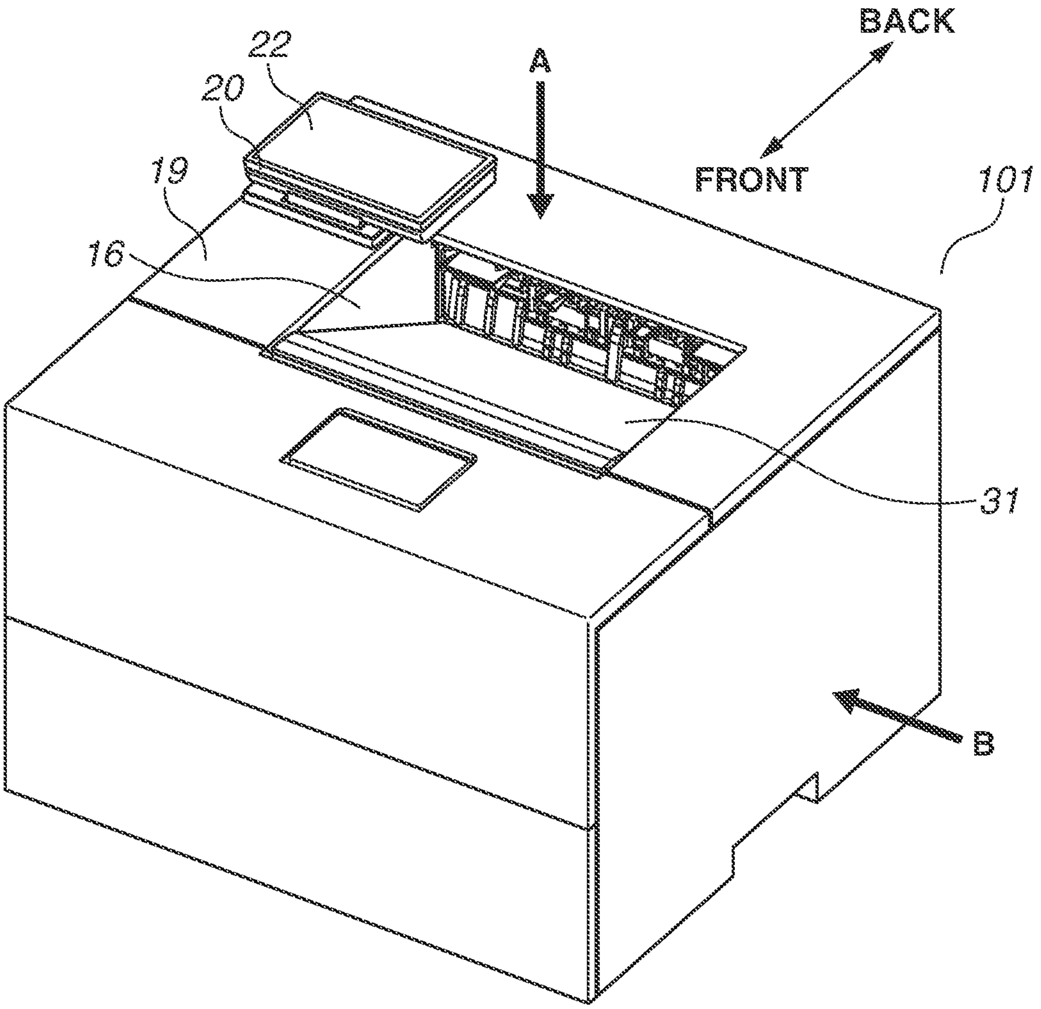
FIG. 2 is a perspective view illustrating an arrangement of an operation unit according to the first exemplary embodiment.
Figure 3:
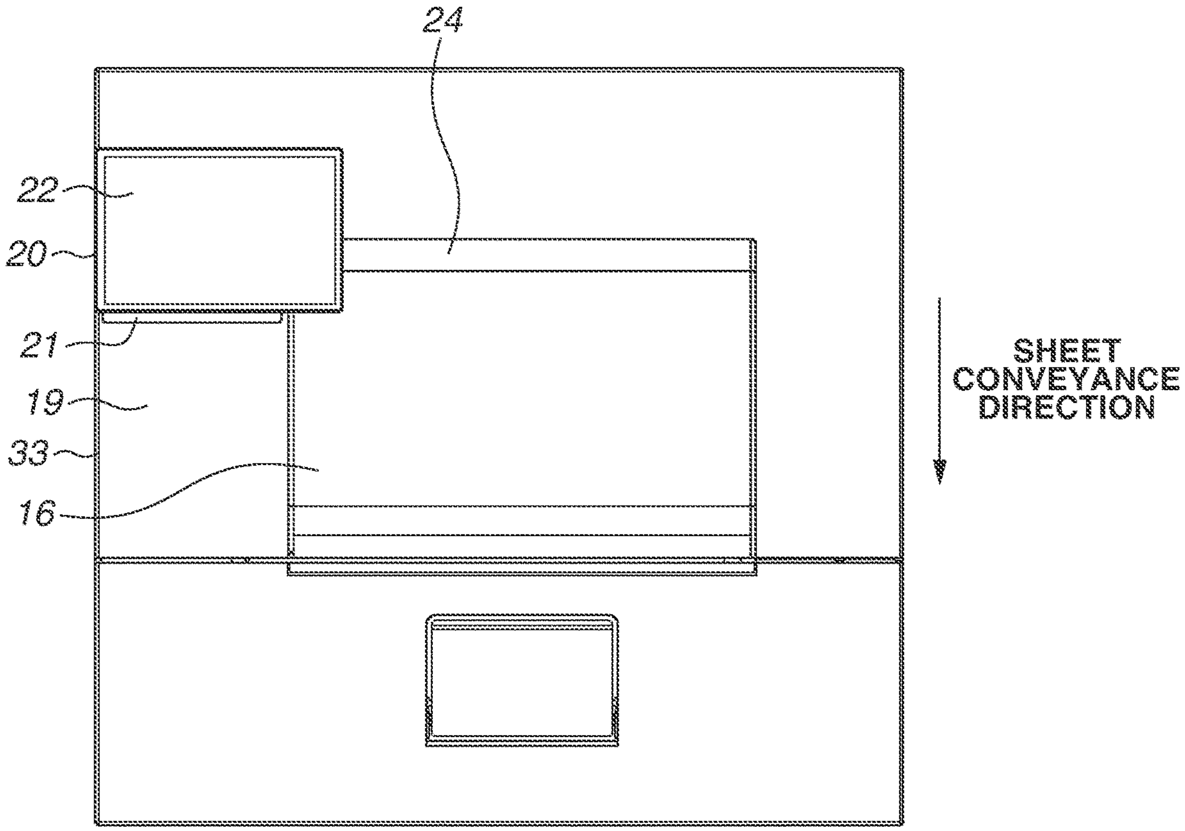
FIG. 3 is a top view of the image forming apparatus according to the first exemplary embodiment as viewed in a vertical direction.

FIG. 1 is a cross-sectional view illustrating a configuration in a case where the image forming apparatus is applied to an electrophotographic laser beam printer having a double-sided image forming function, as an example of the image forming apparatus according to the present exemplary embodiment. FIGS. 2 and 3 are diagrams illustrating an arrangement of an operation unit 20 according to the first exemplary embodiment, FIG. 2 is a perspective view, and FIG. 3 is a top view of FIG. 2 as viewed in a direction A being a vertical direction. It is noted that the dimensions, materials, shapes, relative arrangements, and the like of the components described in the exemplary embodiment are not intended to limit the scope of the present invention to those alone unless otherwise specified. Further, the image forming apparatus according to the present exemplary embodiment is not limited to the laser beam printer, and may be applied to another image forming apparatus such as a copying machine and a facsimile.

Roughly speaking, the image forming apparatus 101 illustrated in FIG. 1 includes a sheet feeding unit, an image forming unit, a fixing unit, a paper ejection reversing unit, and a double-sided conveying unit. The image forming apparatus 101 includes a process cartridge 1 detachably attachable to the apparatus main body. The process cartridge 1 includes a photosensitive drum 2 and a processing unit such as a developing unit (not illustrated) and a charging roller.

A scanner unit 3 is arranged vertically above the process cartridge 1, and the photosensitive drum 2 is exposed based on an image signal. The photosensitive drum 2 is charged to a predetermined negative potential by a charging roller (not illustrated), and then an electrostatic latent image is formed by the scanner unit 3.

The electrostatic latent image undergoes reversal development by a developing unit (not illustrated) in the process cartridge 1, and a negative toner is caused to adhere to form a toner image.

The sheet feeding unit includes a feeding roller 4 mounted on the image forming apparatus 101 and a feeding cassette 5 that houses the sheets, and the feeding cassette 5 is detachably attached to the image forming apparatus main body 101. The sheets S housed in the feeding cassette 5 are separately fed one by one from the feeding cassette 5 by the feeding roller 4 rotated by the power of a paper feed drive unit (not illustrated). The fed sheets S are conveyed to a registration roller pair 7 by a conveyance roller pair 6, undergo skew correction by the registration roller pair 7, and are conveyed to a transfer unit.

The transfer unit is configured to apply a positive bias to a transfer roller 8 by a bias applying unit (not illustrated). As a result, the toner image is transferred as an unfixed image to the sheets S conveyed to the transfer unit.

The sheets S on which the toner image is transferred are conveyed to a fixing apparatus 9 provided on a downstream side in the conveyance direction of sheets S in the transfer unit. The fixing apparatus 9 fixes the toner image transferred to the sheet S, and has a heating roller 10 heated by a heater being a heating unit (not illustrated), and a pressurizing roller 11 being a pressing member that rotates in a state of being pressed against the heating roller 10. The sheet S is pinched and conveyed by a fixing nip portion formed of the heating roller 10 and the pressurizing roller 11, and heat and pressure are applied to the toner image, so that the toner image is fixed on the surface of the sheet S.

The sheet S on which the toner image is fixed, that is, the sheet S on which the image is formed is conveyed from the fixing apparatus 9 to the paper ejection reversing unit. The paper ejection reversing unit has a triple roller including a drive roller 13, a paper ejection roller 14, and a reversing roller 15, and the paper ejection roller 14 and the reversing roller 15 are driven rollers. The paper ejection reversing unit also has a double-sided flapper 12. The drive roller 13 can receive drive from a drive source (not illustrated) and rotate, and each of the paper ejection roller 14 and the reversing roller 15 as driven rollers is in contact with the drive roller 13 to form a nip portion, and forms a roller pair in which each of the paper ejection roller 14 and the reversing roller 15 rotates in a driven manner, as the drive roller 13 rotates.

In the roller pairs, the roller pair formed of the drive roller 13 and the paper ejection roller 14 is a discharge roller pair configured to discharge the sheets S to a stack unit 16. As illustrated in FIG. 2, the stack unit 16 is provided at a position recessed from an upper exterior unit 19 and has a stack surface 31 on which the discharged sheets are stacked. The stack surface 31 has an inclined surface with the upstream side in the discharge direction of the sheets S being most recessed from the upper surface and the recess gradually becoming shallower toward the downstream side. Further, the roller pair formed of the drive roller 13 and the reversing roller 15 is a reversal roller pair configured to discharge a part of the sheet S to the outside of the image forming apparatus 101 and then conveys the sheet S to the inside of the image forming apparatus 101. In the present exemplary embodiment, the upper exterior unit 19 forms an upper surface cover of the image forming apparatus.

Figure 5:
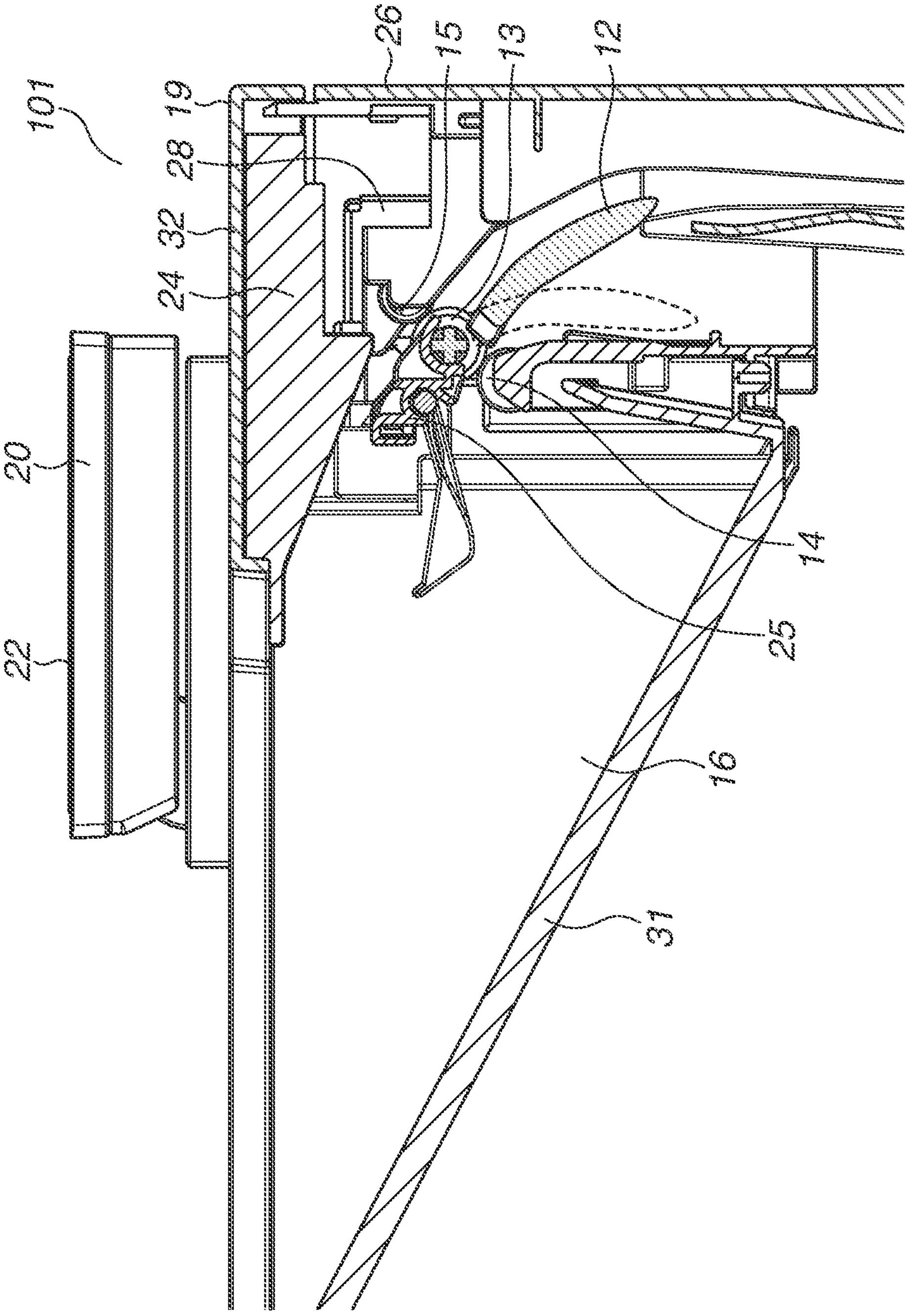
FIG. 5 is a cross-sectional view illustrating a configuration of a sheet discharge unit according to the first exemplary embodiment.

In a case where a single-sided image forming operation (single-sided printing) in FIG. 5 is performed, the double-sided flapper 12 stands by at a position indicated by a solid line so that the sheet S is led to the discharge roller pair formed by the drive roller 13 and the paper ejection roller 14.

The conveyed sheet S is then discharged by the drive roller 13 and the paper ejection roller 14 onto the stack unit 16 on which the discharged sheets S are stacked outside the image forming apparatus 101.

In a case where a double-sided image forming operation is performed (double-sided printing), the double-sided flapper 12 stands by at a position indicated by a dotted-line so that the sheet S is led to the reversal roller pair formed of the drive roller 13 and the reversing roller 15, and the sheet S is conveyed by the fixing apparatus 9 to the reversal roller pair. The drive roller 13 performs reverse rotation by a rotation direction switching unit (not illustrated) at the timing when the trailing edge of the sheet S reaches a predetermined position. At this time, a part of the sheet S is discharged to the outside of the image forming apparatus 101 when the trailing edge of the sheet S reaches a predetermined position.

As a result of the reverse rotation of the drive roller 13, the sheet S passes through a duplex conveyance roller pair 17 and a re-feeding roller pair 18 with an end on the upstream side in the discharge direction passing first, and is re-conveyed in an upside down state with respect to the registration roller pair 7. After that, as in the case of single-sided printing, the second side of the sheet S undergoes skew correction by the registration roller pair 7, transfer by the transfer roller 8, and fixation by the fixing apparatus 9, and the sheet S is discharged to the stack unit 16 by the drive roller 13 and the paper ejection roller 14 to complete the double-sided printing.

Next, the sheet discharge unit according to the present exemplary embodiment will be described with reference to FIGS. 2 to 14. In the description below, the illustration of fastening members such as screws is omitted. The operation unit 20 configured to receive operation of the image forming apparatus 101 is arranged on the upper exterior unit 19 being a part of the exterior surface of the image forming apparatus 101, and includes a display unit 22 configured to display information regarding image forming processing such as the number of sheets at the time of printing, the remaining amount of the developer, and the like.

As illustrated in FIG. 3, the operation unit 20 is arranged to overlap the stack unit 16 when viewed in the vertical direction. The operation unit 20 is arranged not to protrude outward from a side surface 33 of the image forming apparatus 101, that is, arranged inside the side surface 33. Further, the operation unit 20 is located on a side of the roller pair illustrated in FIG. 1, in the discharge direction of the sheets S with respect to the center of the image forming apparatus 101. The operation unit 20 also overlaps an upper guide unit, which will be described below, when viewed in the vertical direction.

Figure 4A:
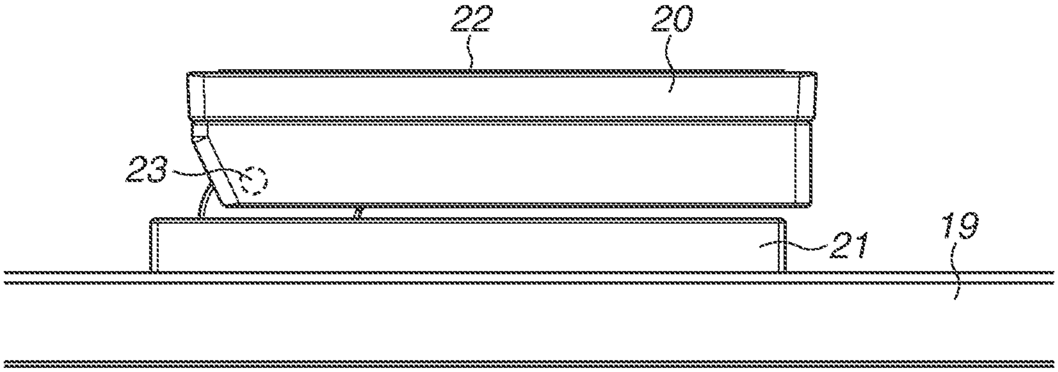
FIGS. 4A and 4B are side views illustrating a configuration of the operation unit according to the first exemplary embodiment.
Figure 4B:
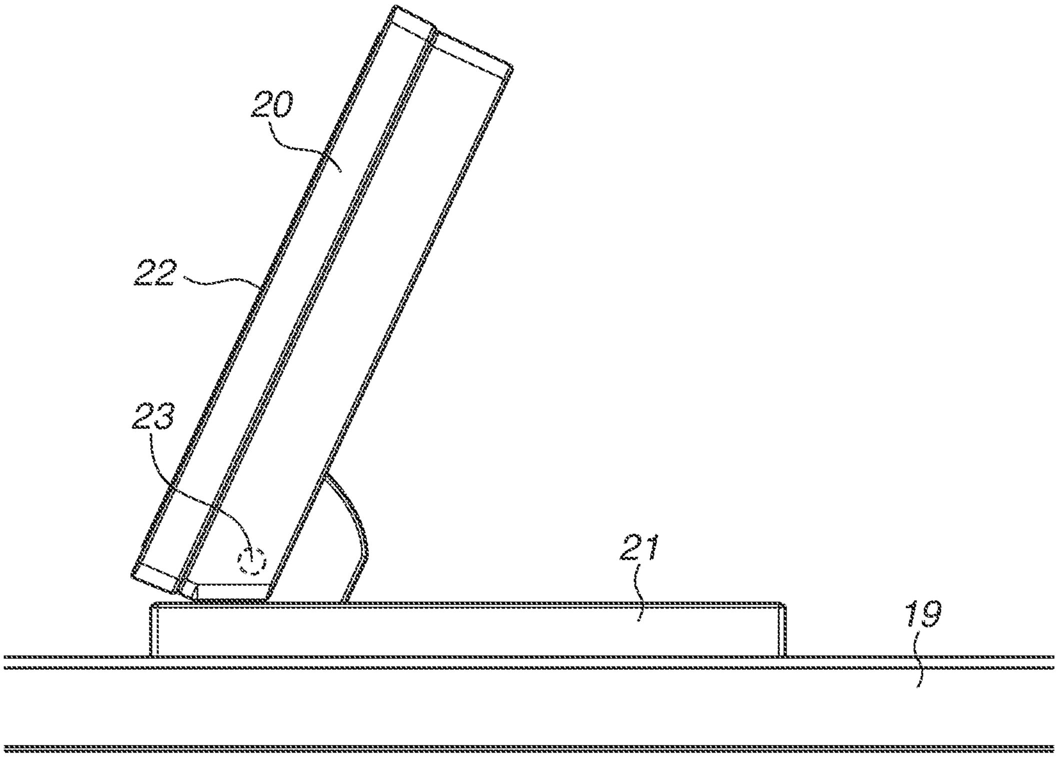

FIGS. 4A and 4B are diagrams illustrating a configuration of the operation unit, and are side views of FIG. 2 as seen in a direction B. The operation unit 20 is supported by a hold unit 21 located on the upper exterior unit 19. The operation unit 20 is configured to be rotatable with respect to the hold unit 21 around a rotation center portion 23. The hold unit 21 fits inside a width of the upper exterior unit 19 with respect to the width direction of the sheet S intersecting the conveyance direction of the sheets S, and does not protrude toward the stack unit 16, and does not overlap the upper guide unit described below when viewed in the vertical direction.

The provision of the rotation center portion 23 enables the operation unit 20 to take a first position where the operation unit 20 is arranged substantially parallel to the upper exterior unit 19 as illustrated in FIG. 4A, when the operation unit 20 is attached to the upper exterior unit 19. Further, the operation unit 20 can take a second position where the operation unit 20 is rotated up to the maximum angle to which rotation can be performed with respect to the upper exterior unit 19, as illustrated in FIG. 4B. By rotating the operation unit 20 in this way, the operation unit is easily seen when the user operates the image forming apparatus 101. Further, the operation unit 20 can be fixed not only at the first position and the second position but also at an angle between the positions, and the user can rotate the operation unit 20 to an angle where the operation unit 20 is easy to use.

According to the configuration of the present exemplary embodiment, the display unit 22 includes a touch sensor, and a user touches the touch sensor to perform an operation on and give an instruction to the image forming apparatus 101. The display unit 22 may only have a function of displaying information and the like related to image forming processing, and may not have a function as an operation unit. Further, the operation unit 20 may have a configuration where the image forming apparatus 101 is operated by a button or the like.

FIG. 5 is a cross-sectional view illustrating a configuration of the sheet discharge unit, and is a view of FIG. 2 as seen in the direction B. The sheet discharge unit includes the double-sided flapper 12 configured to guide the sheets to the paper ejection path or the reversing path, and a triple roller including the drive roller 13, the paper ejection roller 14, and the reversing roller 15.

Further, the sheet discharge unit includes the stack unit 16 on which the sheets S discharged by the drive roller 13 and the paper ejection roller 14 are stacked, and a lower guide unit 25 configured to guide the lower surface of the sheets S conveyed by the drive roller 13 and the reversing roller 15.

Further, the image forming apparatus 101 is fixedly provided on the image forming apparatus 101 and includes an upper guide unit 24 configured to guide the upper surfaces of the sheets S conveyed by the drive roller 13 and the reversing roller 15. The upper guide unit 24 extends downstream in the discharge direction along the discharge direction of the sheets S discharged by the roller pair formed of the drive roller 13 and the reversing roller 15. In the present exemplary embodiment, the upper guide unit 24 and an upper surface cover 32 configured to cover the upper surface of the image forming apparatus 101 are separate members, but the upper guide unit 24 and the upper surface cover 32 may be integrally formed.

When the sheet S is conveyed to the drive roller 13 and the paper ejection roller 14 by the double-sided flapper 12, the sheet S is discharged and stacked on the stack unit 16. Further, when the sheet S is conveyed to the drive roller 13 and the reversing roller 15 by the double-sided flapper 12 at the position indicated by the dotted line, a part of the sheet S is conveyed to the outside of the apparatus above the stack unit 16 while the lower guide unit 25 guides the lower surface side of the sheet and the upper guide unit 24 guides the upper surface side of the sheet. After that, the drive roller 13 is rotated in the reverse direction by the rotation direction switching unit (not illustrated), and the sheet S is inverted and conveyed to the inside of the apparatus.

Figure 6:
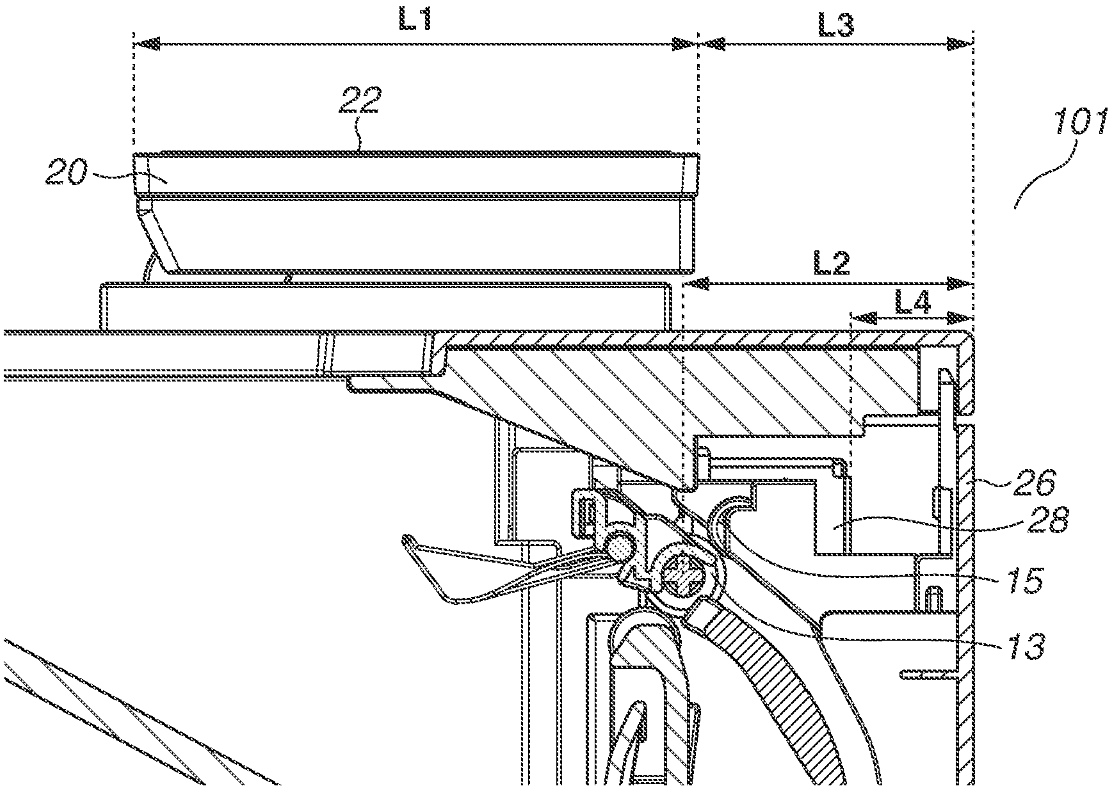
FIG. 6 is an enlarged view of FIG. 5 illustrating an area in the vicinity of the operation unit according to the first exemplary embodiment.

FIG. 6 is an enlarged view of FIG. 5 illustrating a configuration in the front-rear direction of the apparatus being a direction horizontal to the discharge direction of the sheets in the sheet discharge unit. A size L1 of the operation unit 20 in the direction horizontal to the discharge direction of the sheets and a distance L2 from the drive roller 13 to a back cover 26 have a relationship of L1>L2. Accordingly, the operation unit 20 is arranged closer to a front surface of the image forming apparatus 101 than the drive roller 13.

A distance L3 from the operation unit 20 to the back cover 26 and a distance L4 from the rear surface of a frame 28 configured to support the image forming unit (not illustrated) to the back cover 26 have the relationship L3>L4. That is, the operation unit 20 is arranged, in the horizontal direction, closer to a front side of the frame 28 than a back side of the apparatus. This is to secure a receiving surface of a packaging material 29 during transportation of the image forming apparatus 101.

Figure 7A:
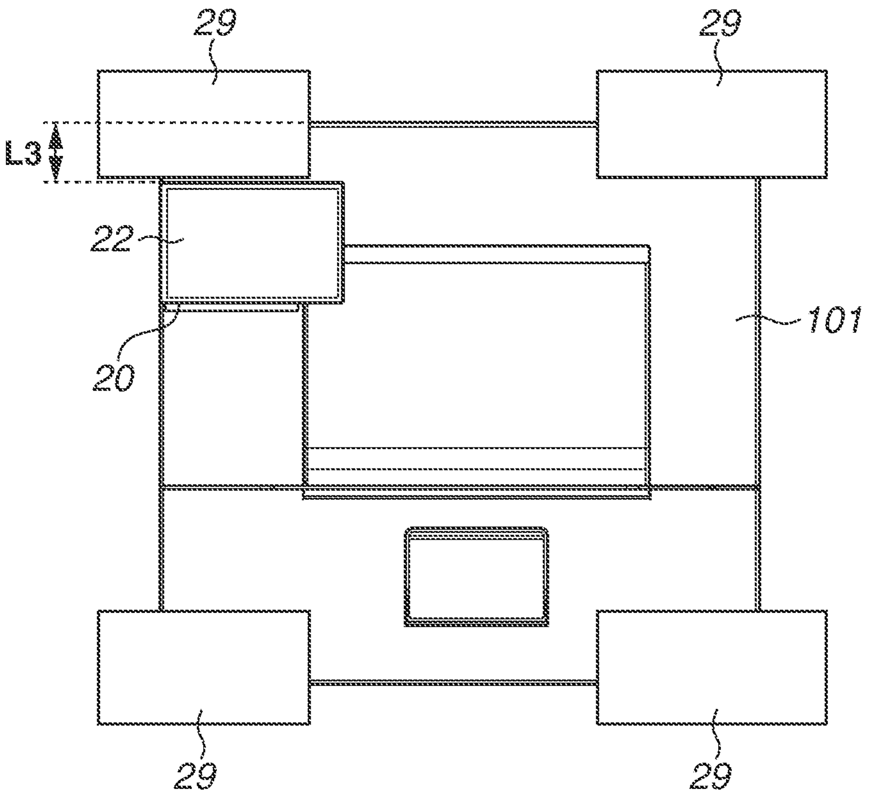
FIGS. 7A and 7B are top views illustrating an example of arrangement of a packaging material of the image forming apparatus according to the first exemplary embodiment.
Figure 7B:
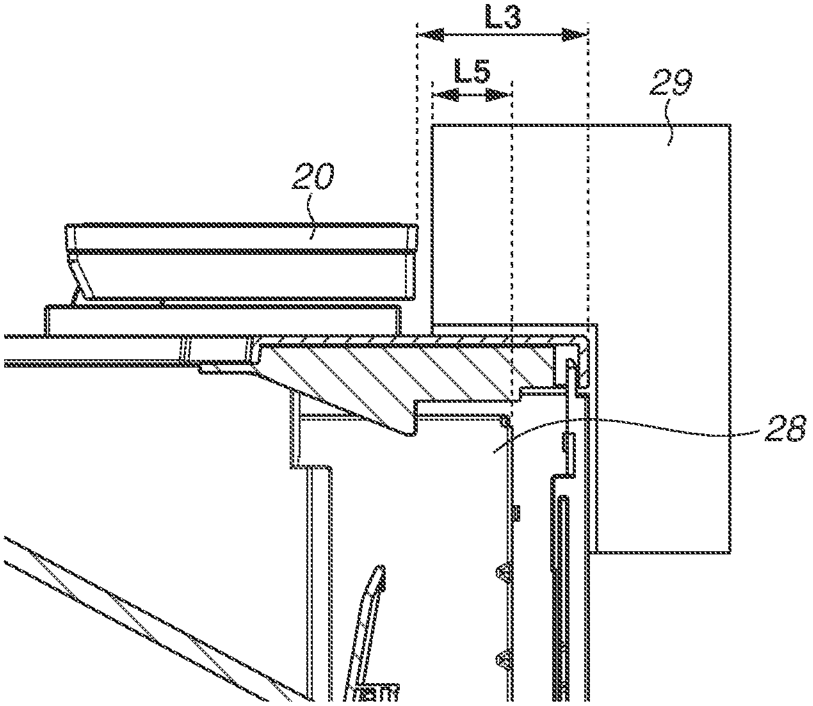

FIGS. 7A and 7B are views illustrating an example of arrangement of the packaging material 29 of the image forming apparatus 101 during transportation of the image forming apparatus 101, FIG. 7A is a top view seen in a vertical direction, and FIG. 7B is a view obtained when FIG. 7A is seen in a B direction of FIG. 2. In FIG. 7B, a part of the configuration of the sheet discharge unit not used for the description is omitted. As illustrated in FIG. 7A, the packaging material 29 is generally configured to receive four corners of the image forming apparatus 101. As illustrated in FIG. 7B, arrangement is that the packaging material 29 provided between the operation unit 20 and the back surface of the image forming apparatus 101 (L3 portion) overlaps with the frame 28 when viewed in the vertical direction (L5 portion).

As a result, an external force is received by the frame 28 via the packaging material 29. In view of these points, in the present exemplary embodiment, the arrangement of the operation unit 20 in a front-back direction of the apparatus, which is horizontal to the sheet discharge direction, is as illustrated in FIG. 6.

Figure 8A:
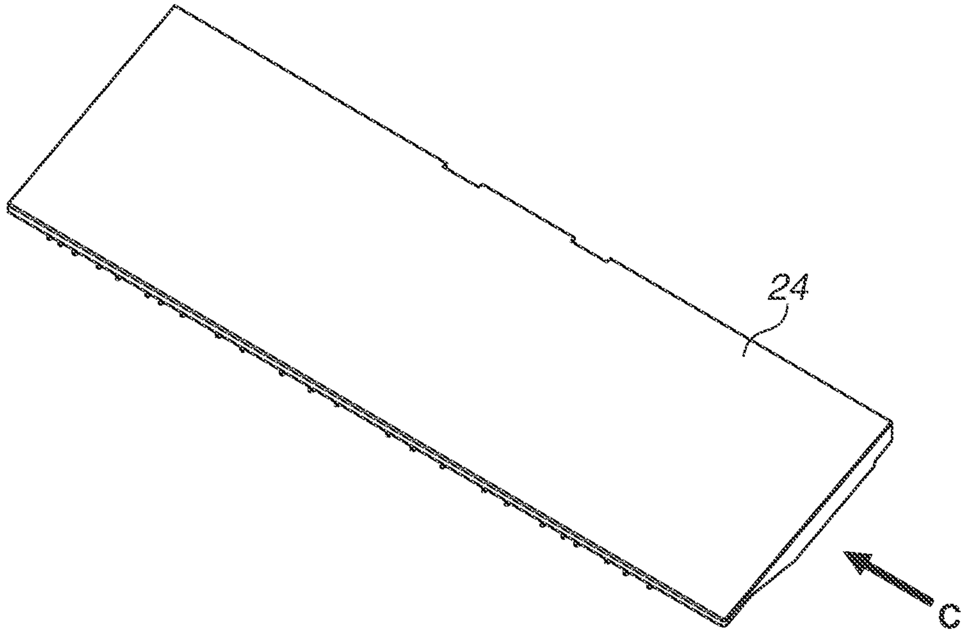
FIGS. 8A and 8B are perspective views illustrating a shape of an upper guide unit according to the first exemplary embodiment.
Figure 8B:
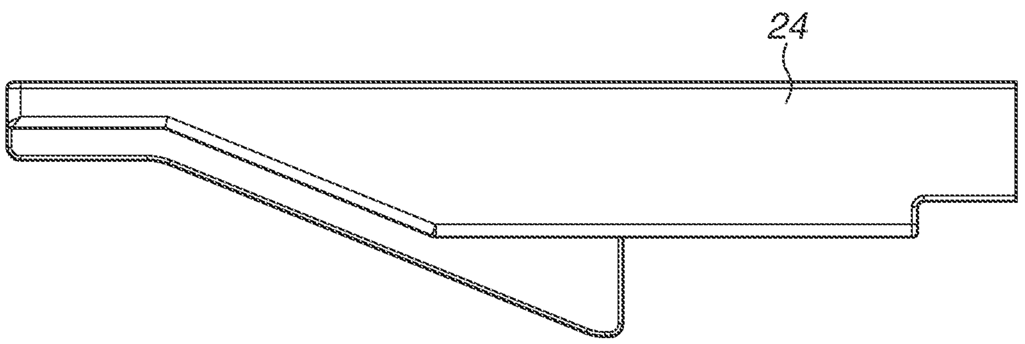

FIGS. 8A and 8B are views illustrating the shape of an upper guide unit 24, FIG. 8A is a perspective view, and FIG. 8B is a side view obtained when FIG. 8A is viewed in a C direction. An attachment shape to the upper surface cover 32 as an upper exterior unit, removal of an unnecessary part, and the like are omitted in the upper guide unit 24 of FIGS. 8A and 8B.

Figure 9:
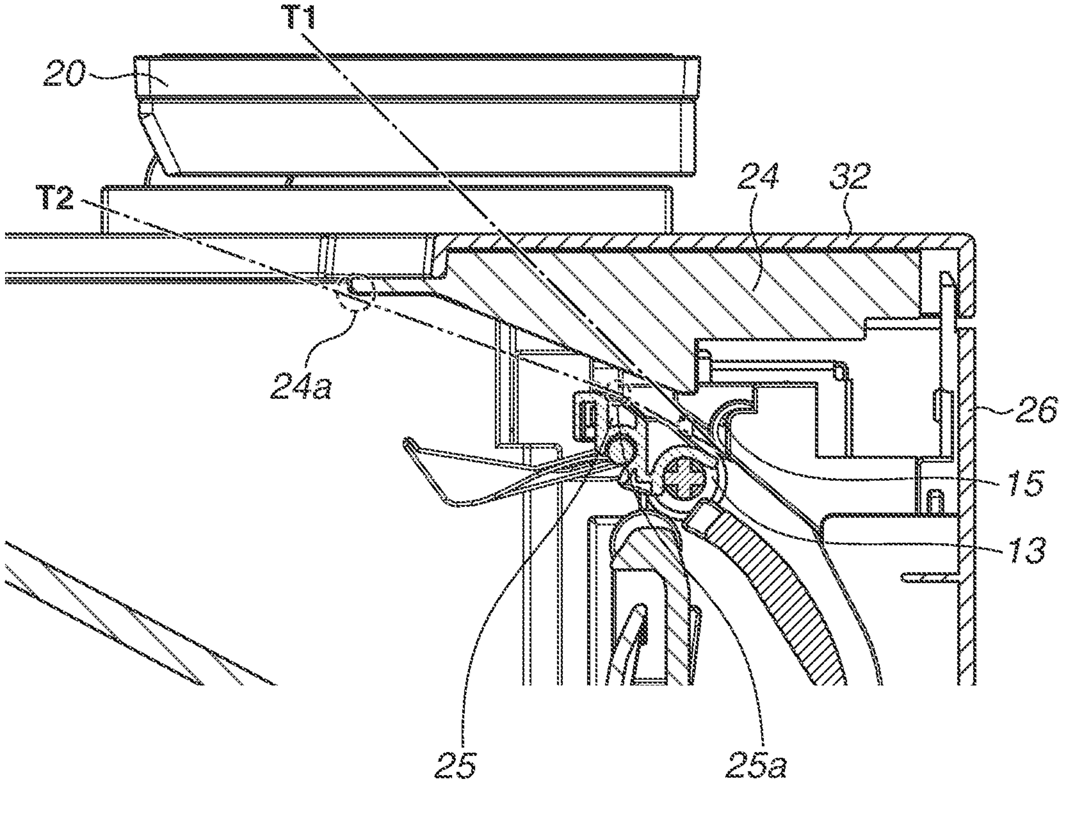
FIG. 9 is a cross-sectional view illustrating a relationship between a sheet discharge direction and the operation unit in a case where the operation unit according to the first exemplary embodiment is at a first position.

FIG. 9 is an enlarged view of FIG. 5 illustrating a relationship between a locus of the sheet S to be inverted and conveyed and the operation unit 20 in the sheet discharge unit. A line T1 as a first straight line is a straight line being orthogonal to a plane passing through a center of the drive roller 13 and a center of the reversing roller 15 and passing through the nip portion formed of the drive roller 13 and the reversing roller 15, that is, a nip tangent line T1. When viewed in an axial direction of the drive roller 13 and the reversing roller 15, the nip tangent line T1 is at a position where the nip tangent line T1 passes through the operation unit 20 and the upper guide unit 24.

Next, a line T2 as a second straight line in FIG. 9 is a straight line in contact with both an upper guide unit distal end 24*a* that is the most downstream portion of the upper guide unit 24 in the discharge direction of the sheet S and a lower guide unit distal end 25*a* that is a contact point between the sheet S and the lower guide unit 25. The line T2 is a straight line drawn to be closest to the operation unit 20 when the sheet S is discharged. The upper guide unit distal end 24*a* is a portion of the upper guide unit 24 and being located most downstream in the discharge direction of the sheet S. When viewed in the axial direction of the roller pair, the line T2 does not pass through the operation unit 20, so that the sheet S to be inverted and conveyed does not come into contact with the operation unit 20.

Accordingly, the sheet S to be inverted and conveyed is conveyed as follows. Firstly, the sheet S is conveyed in a line T1 direction by the drive roller 13 and the reversing roller 15. Next, due to an overlapping relationship between the upper guide unit 24 and the line T1, the sheet S comes into contact with the upper guide unit 24. Upon coming into contact with the upper guide unit 24, the sheet S changes a moving direction, and is conveyed along a guide shape of the upper guide unit 24. Subsequently, the sheet S is conveyed so that a part of the sheet S is discharged to the outside of the apparatus along the locus of the line T2 while a lower surface of the sheet S is guided by the lower guide unit 25 and an upper surface thereof is guided by the upper guide unit 24.

Figure 10:
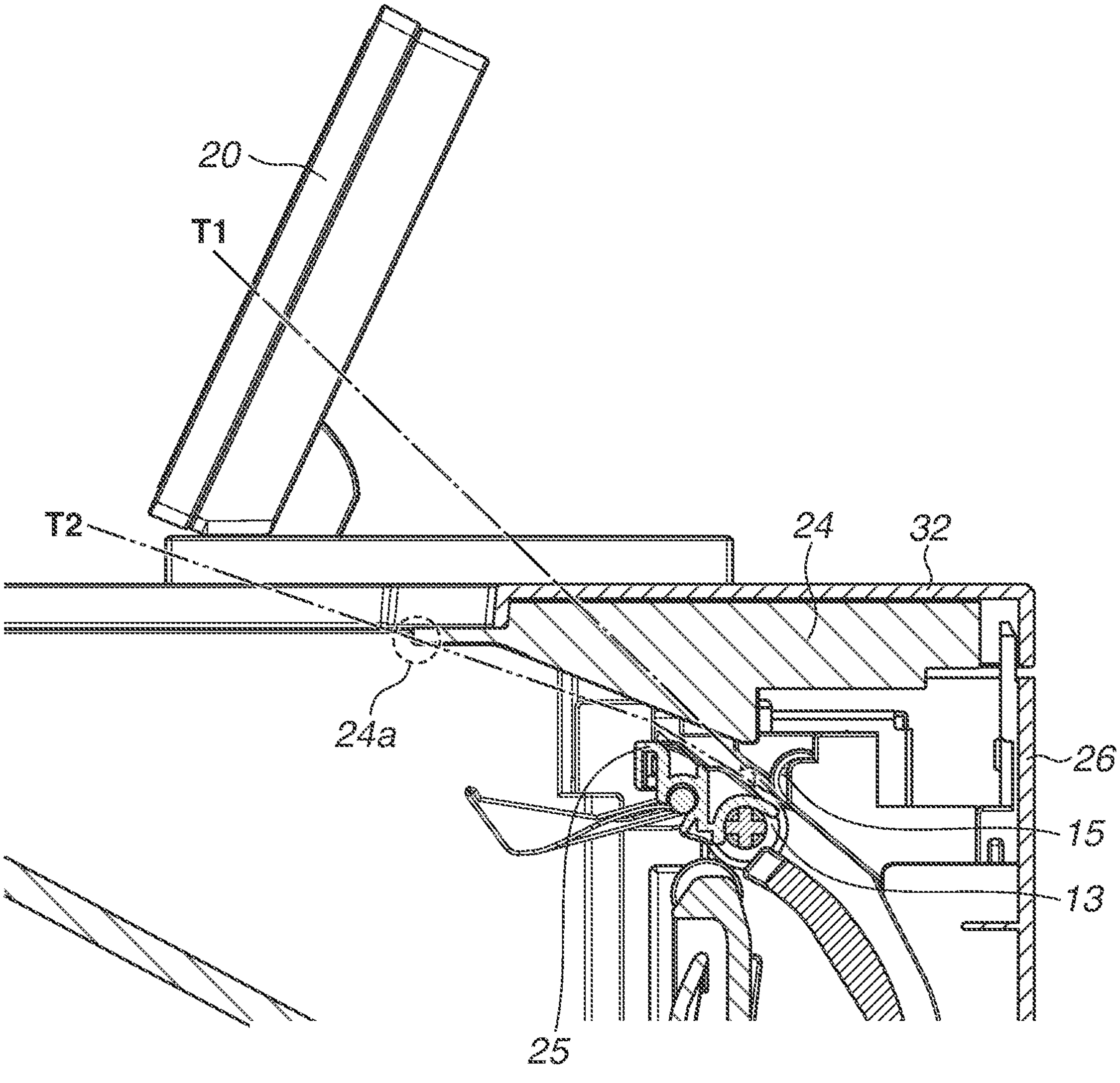
FIG. 10 is a cross-sectional view illustrating a relationship between the sheet discharge direction and the operation unit in a case where the operation unit according to the first exemplary embodiment is at a second position.

When the drive roller 13 is rotated in a reverse direction by a rotation direction switching unit (not illustrated), the sheet S is inverted and conveyed in the apparatus along the locus of the line T2 while being similarly guided by the lower guide unit 25 and the upper guide unit 24. As a result, the sheet S to be inverted and conveyed can be conveyed without making any contact with the operation unit 20. It is noted that as illustrated in FIG. 10, even in a case where the operation unit 20 is at the second position, the line T2 is arranged below the operation unit 20. For this reason, as in the case where the operation unit 20 is at the first position, the sheet S to be inverted and conveyed can be conveyed without making any contact with the operation unit 20.

That is, in a case where there is no upper guide unit 24, the sheet S and the operation unit 20 come into contact with each other, but due to presence of the upper guide unit 24, the sheet S to be discharged does not come into contact with the operation unit 20. In the present exemplary embodiment, the drive roller 13 and the reversing roller 15 are configured as a reversal roller pair so that a part of the sheet S is discharged to the outside of the image forming apparatus 101 and the sheet S is subsequently conveyed to the inside of the image forming apparatus 101, but another configuration may also be possible. For example, even when a single roller pair may serve as both the reversal roller pair and the discharge roller pair so that the drive roller 13 and the reversing roller 15 do not only reverse the sheet S but also discharge, as a discharge roller pair, the sheet S to the stack unit 16, a similar effect can be obtained. A similar effect can be obtained for the discharge roller pair of the image forming apparatus provided only with a one-sided printing function without a sheet reversing function.

Figure 11:
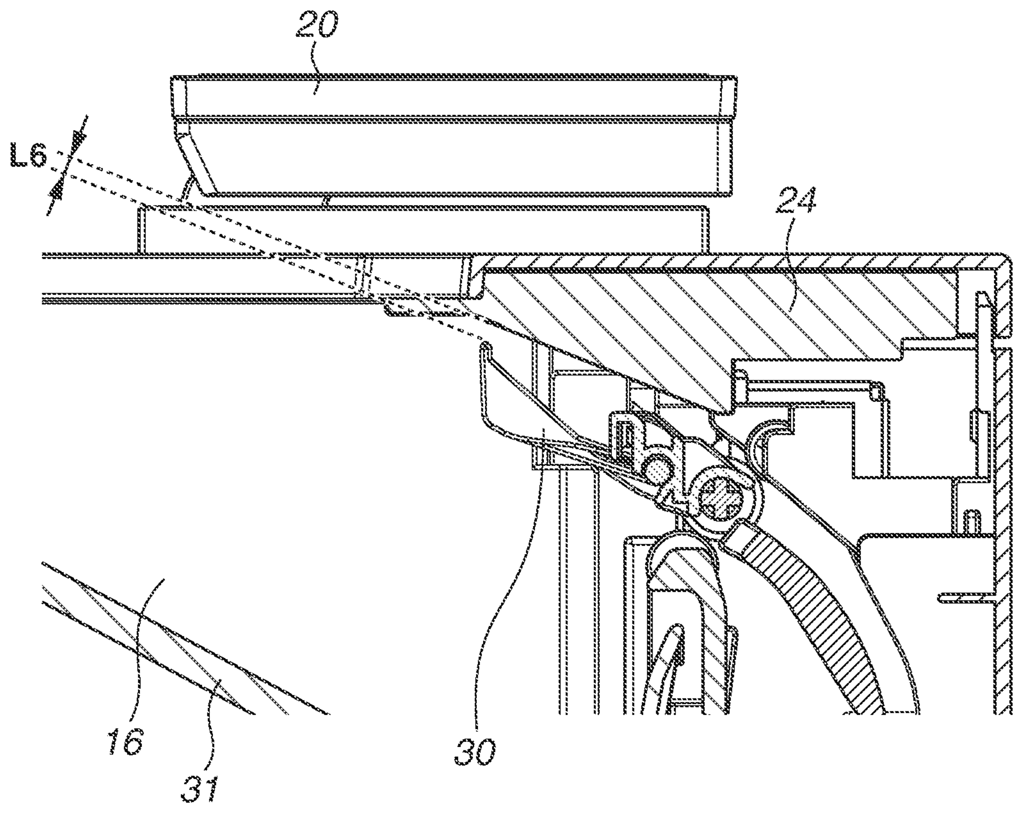
FIG. 11 is a cross-sectional view illustrating a relationship between states of a guide unit and a detection unit according to the first exemplary embodiment.

Next, FIG. 11 is a cross-sectional view illustrating a relationship between the upper guide unit 24 and a swing-up state of the detection unit 30 configured to detect that an amount of sheets on the stack unit has reached a predetermined amount. The detection unit 30 is located below the upper guide unit 24 in the vertical direction. FIG. 11 illustrates a state where the detection unit 30 is swung up by the maximum amount. Even in a case where the detection unit 30 is swung up by the maximum amount, a distance L6 is provided between the detection unit 30 and the upper guide unit 24 to prevent contact. That is, the detection unit 30 does not come into contact with the upper guide unit 24 when the maximum amount of sheets S is stacked on the stack unit 16. As a result, even in a case where the detection unit 30 is swung up by the maximum amount, the detection unit 30 does not come into contact with the upper guide unit 24 and does not block the conveyance path.

Figure 12:
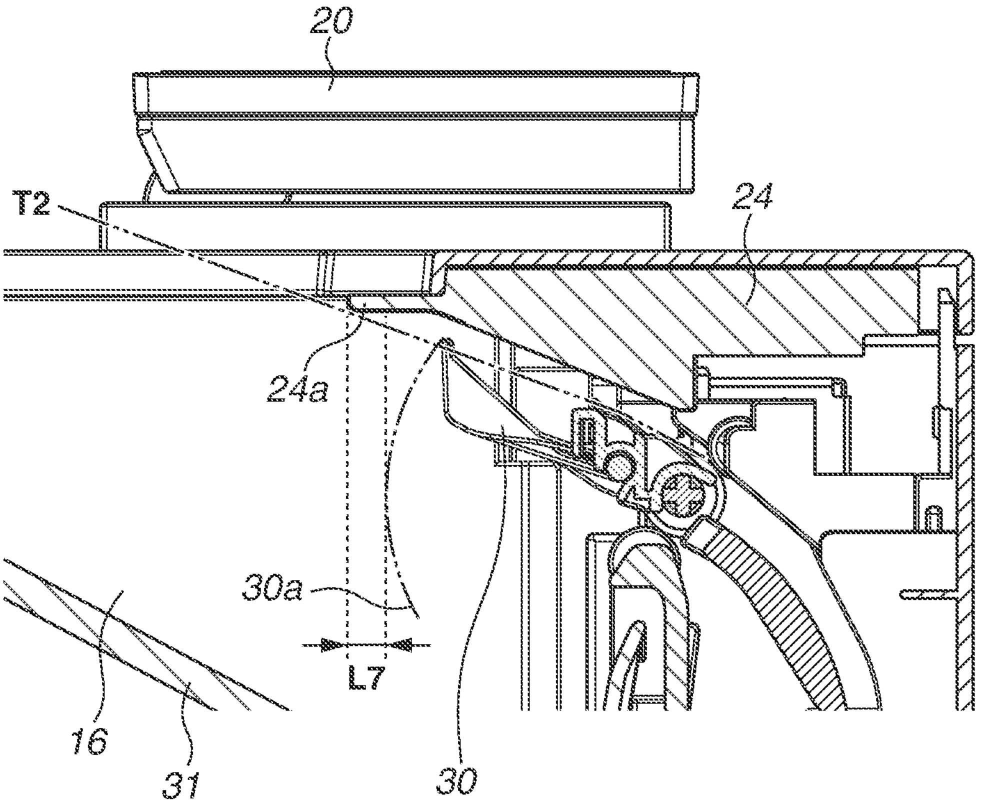
FIG. 12 is a cross-sectional view illustrating a relationship between rotation loci of the guide unit and the detection unit according to the first exemplary embodiment.

FIG. 12 is a cross-sectional view illustrating a relationship between the upper guide unit 24 and a rotation locus of the detection unit 30.

A line 30*a* indicates the rotation locus of the detection unit 30. When an end of the detection unit 30 is located most downstream in the discharge direction of the sheet S due to rotation, the end of the detection unit 30 is located on an upstream side in the discharge direction of the sheet S by a distance L7 from the upper guide unit distal end 24*a*.

Accordingly, even in a case where another sheet S is discharged to the stack unit 16 when the sheet S is inverted and conveyed, the inverted sheet S can be conveyed without coming into contact with the operation unit 20. Even in a case where the operation unit 20 is at the second position, the line T2 is arranged below the operation unit 20. For this reason, as in the case where the operation unit 20 is at the first position, the sheet S is conveyed without making any contact with the operation unit 20.

Figure 13:
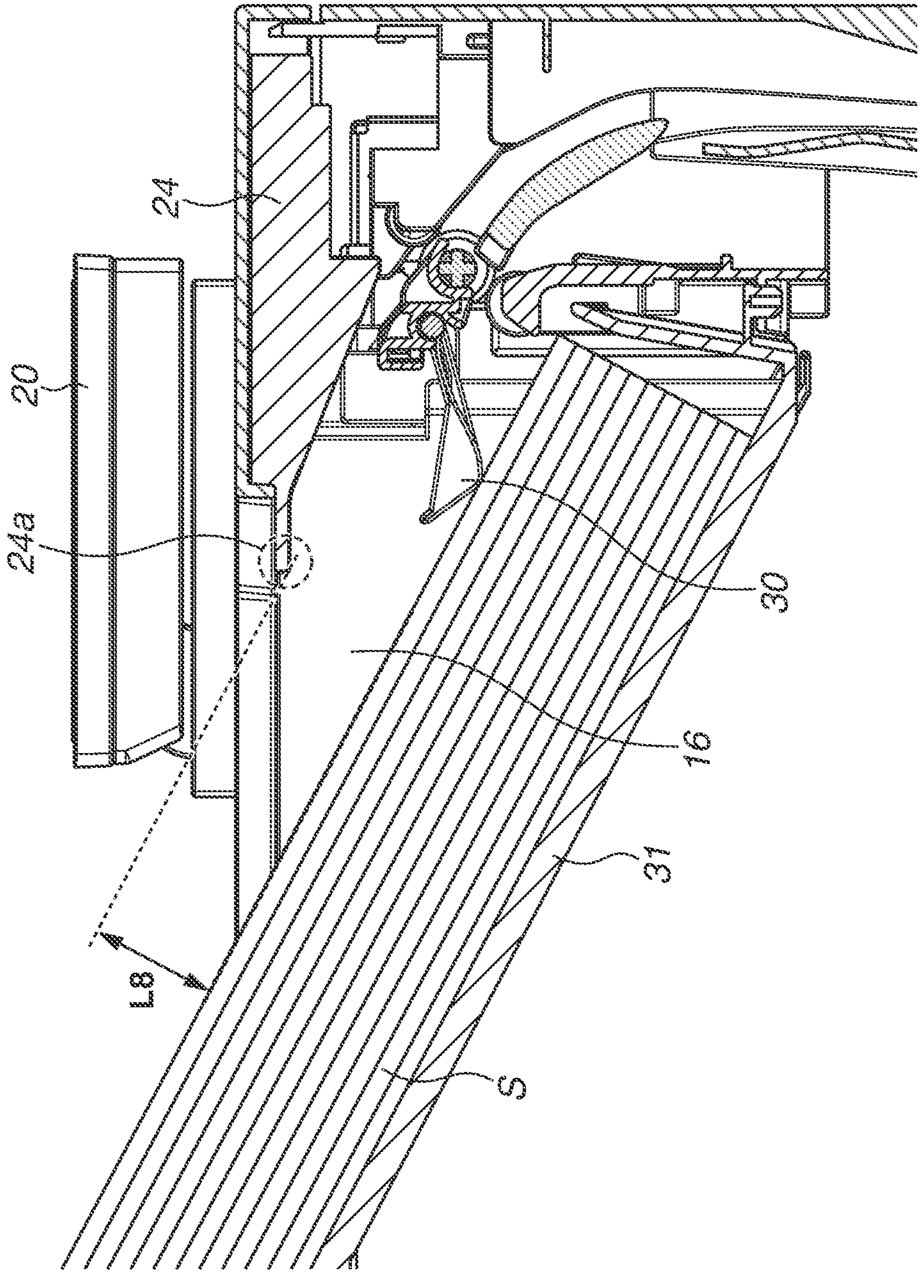
FIG. 13 is a cross-sectional view illustrating a relationship between a guide unit and a sheet stacked on a stack unit according to the first exemplary embodiment.

FIG. 13 illustrates the relationship between the upper guide unit 24 and the sheets S stacked on the stack unit 16. An amount of the sheets S stacked on the stack unit 16 has reached an amount predetermined by the detection unit 30. At this time, a distance L8 is provided between the stacked sheet S and the upper guide unit distal end 24*a*. As a result, the sheet S to be inverted and conveyed can be conveyed without coming into contact with the operation unit 20, and the sheets S can be stacked on the stack unit 16 until the amount of the stacked sheets S reaches the amount predetermined by the detection unit 30.

In this way, when the configuration in which the upper guide unit 24 and the operation unit 20 are at least partially overlapped when viewed in the vertical direction is employed and the upper guide unit 24 is at an appropriate position, the sheet S can be conveyed without coming into contact with the operation unit 20. According to the present exemplary embodiment, it is possible to reduce the size of an image forming apparatus having a large operation unit and to prevent the operation unit from hindering discharge of the sheet.

Figure 14:
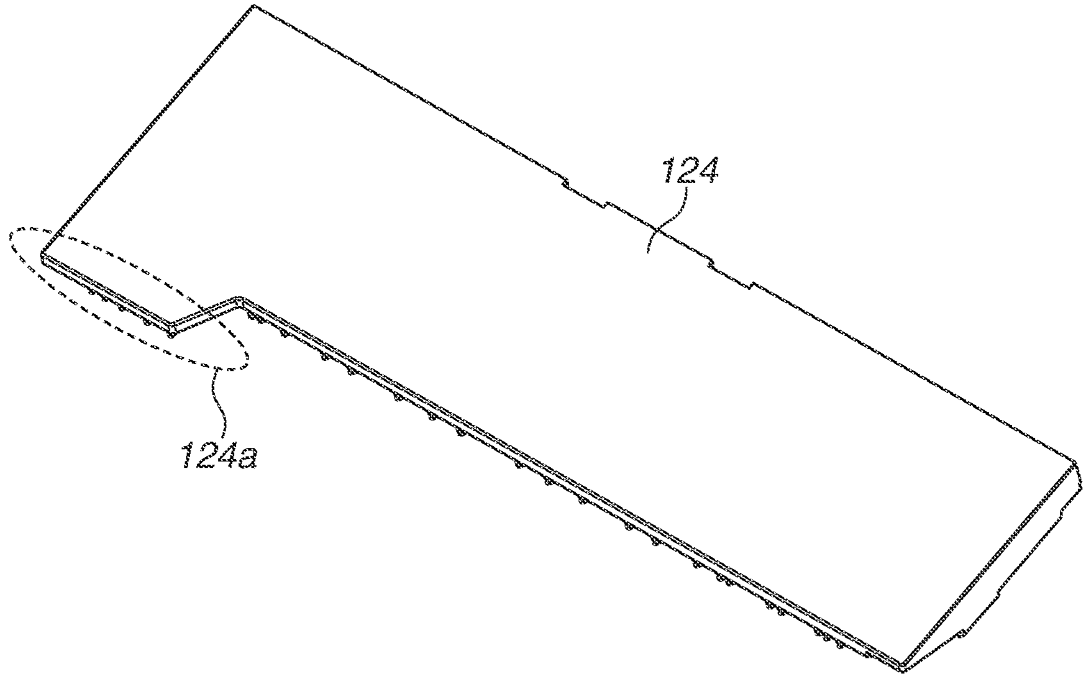
FIG. 14 is a perspective view illustrating a shape of an upper guide unit according to a second exemplary embodiment.
Figure 15:
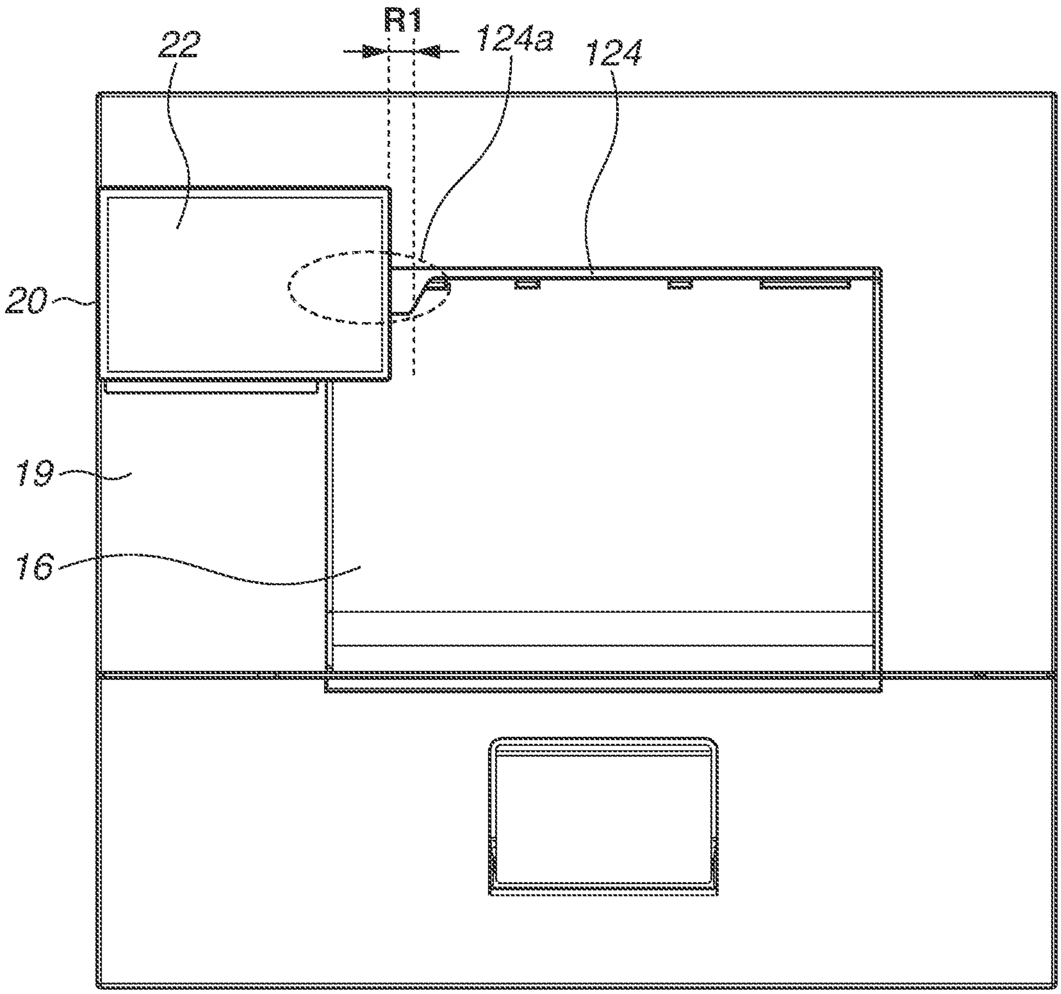
FIG. 15 is a top view of an image forming apparatus according to the second exemplary embodiment as viewed in a vertical direction.

Next, with reference to FIGS. 14 and 15, a second exemplary embodiment of the present invention will be described. In the present exemplary embodiment, the description of the parts common to the first exemplary embodiment is omitted. A difference from the first exemplary embodiment is the configuration of the guide unit. FIG. 14 is a perspective view illustrating the shape of the upper guide unit 124 according to the second exemplary embodiment of the present invention, and FIG. 15 is a top view illustrating the relationship between the upper guide unit 124 and the operation unit when viewed in the vertical direction. An attachment shape to the upper surface cover 32 as an upper exterior unit, removal of an unnecessary part, and the like are omitted in the shape of the upper guide unit 124 of FIG. 14. As can be seen from FIG. 14, a guide unit distal end 124*a* of the upper guide unit 124 on the downstream side in the discharge direction of the sheet S is only partially provided in the sheet width direction orthogonal to the discharge direction of the sheet S.

Specifically, a distance by which the upper guide unit 124 extends downstream along the discharge direction of the sheet S is different in the width direction of the sheet S intersecting the discharge direction of the sheet S, and the distance at an end in the width direction of the sheet S is longer than the distance at the center of the stack unit 16.

As can be seen from FIG. 15, in the sheet width direction, the width of the upper guide unit distal end 124*a* is longer by the distance R1 than the overlapping length between the stack unit 16 and the operation unit 20. Accordingly, it is possible to obtain the same effect as in the first exemplary embodiment, and the sheet S being conveyed does not come into contact with the operation unit 20.

Further, unlike the first exemplary embodiment, in the present exemplary embodiment, the upper guide unit distal end 124*a* configured to restrict the posture of the sheet S is not arranged along the entire width above the stack unit 16 in the sheet width direction orthogonal to the discharge direction of the sheet S, and thus the present exemplary embodiment realizes a minimum arrangement to prevent the sheet S from coming into contact with the operation unit 20. As a result, this configuration is improved in terms of visibility and easy removal of the sheet discharged to the stack unit 16, as compared with the first exemplary embodiment.

Figure 16:
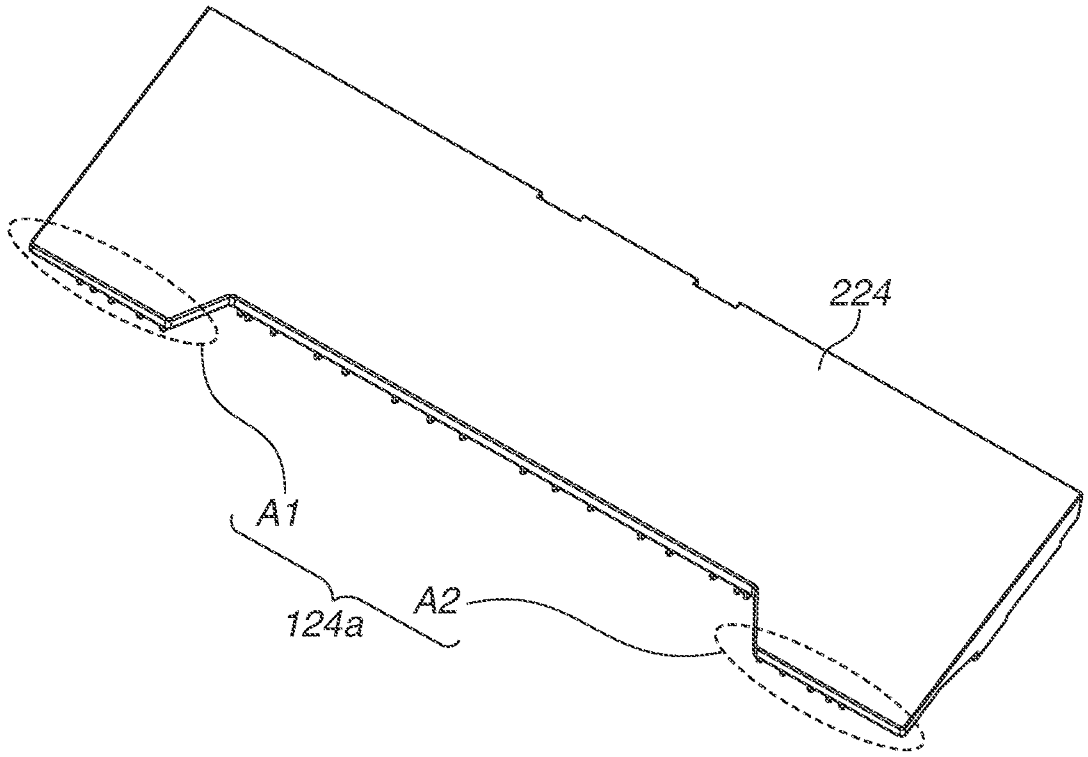
FIG. 16 is a perspective view illustrating a shape of an upper guide unit according to a third exemplary embodiment.
Figure 17:
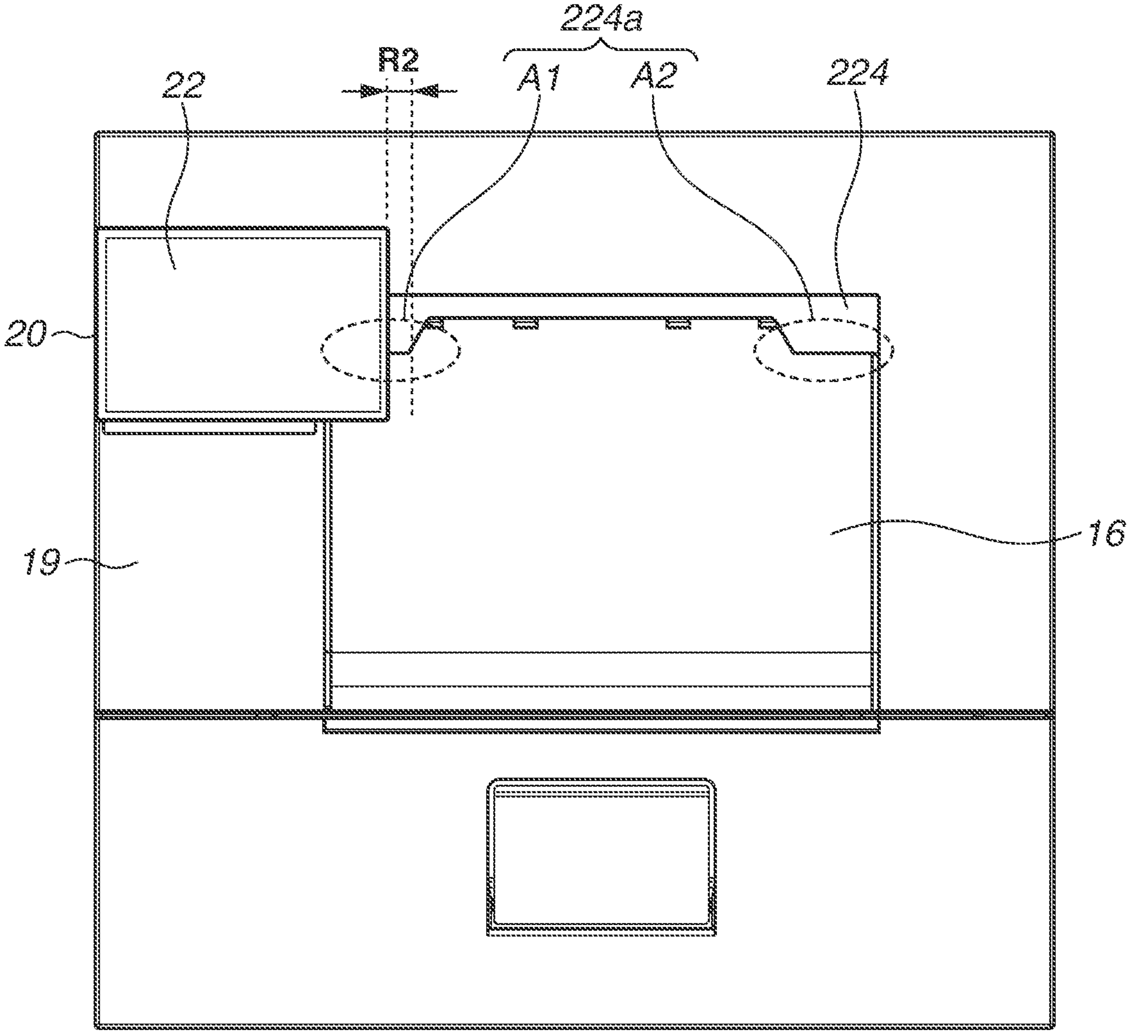
FIG. 17 is a top view of an image forming apparatus according to the third exemplary embodiment as viewed in a vertical direction.

With reference to FIGS. 16 and 17, a third exemplary embodiment of the present invention will be described. In the present exemplary embodiment, the description of the parts common to the first exemplary embodiment is omitted. A difference from the first exemplary embodiment is the configuration of the guide unit. FIG. 16 is a perspective view illustrating the shape of a reversal guide unit in the third exemplary embodiment of the present invention, and FIG. 17 is a top view illustrating the relationship between an upper guide unit 224 and the operation unit 20 when viewed in the vertical direction. An attachment shape to the upper surface cover 32 as an upper exterior unit, removal of an unnecessary part, and the like are omitted in the shape of the upper guide unit 224 of FIG. 16.

As can be seen from FIG. 16, an upper guide unit distal end 224*a* of the upper guide unit 224 on the downstream side in the discharge direction of the sheet S is only partially provided in the sheet width direction orthogonal to the discharge direction of the sheet S. A1 and A2, which are the upper guide unit distal ends 224*a*, protrude symmetrically in the sheet width direction. Similar to the second exemplary embodiment, a distance by which the upper guide unit 224 extends downstream along the discharge direction of the sheet S is different in the width direction of the sheet S, and the distances at both ends in the width direction of the sheet S are longer than the distance at the center of the stack unit.

The width of Al of the upper guide unit distal end 224*a* is longer by the distance R2 than the overlapping length between the stack unit 16 and the operation unit 20 in the sheet width direction. For this reason, it is possible to obtain the same effect as those in the first exemplary embodiment and the second exemplary embodiment, and the sheet S being conveyed does not come into contact with the operation unit 20.

In the present exemplary embodiment, the distance of protrusion at the center portion in the sheet width direction of the upper guide unit 224 is smaller than the distance of protrusion at the left and right portions of the upper guide unit 224, and thus this configuration is improved in terms of visibility and easy removal of the sheet discharged to the stack unit 16, as with the second exemplary embodiment. Further, in the present exemplary embodiment, while the upper guide unit 224 guides the sheet S being conveyed, conveyance resistance is uniform on both sides in the sheet width direction, because the shape of the upper guide unit distal end 224*a* is symmetric in the sheet width direction.

Accordingly, even when a sheet of a paper type having a large basis weight such as thick paper is conveyed, there is no difference in conveyance resistance between the left and right sides in the sheet width direction. For this reason, this configuration is improved not only in terms of visibility and easy removal of the sheet, but also in terms of conveyance. Further, in the present exemplary embodiment, the shape of the upper guide unit 224 is a symmetric shape in the sheet width direction, and thus the appearance quality is not impaired.

Although the exemplary embodiments of the present invention have been specifically described above, the present invention is not limited to the above-described exemplary embodiments, and various modifications based on the technical concept of the present invention are possible.

According to the exemplary embodiments of the present invention, even in a case where the size of an operation unit is increased, it is possible to reduce the size of an image forming apparatus and to prevent the operation unit from hindering discharge of the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-152861, filed Sep. 21, 2021, which is hereby incorporated by reference herein in its entirety.

What is claimed is:

1. An image forming apparatus including an image forming unit configured to form an image on a sheet, the image forming apparatus comprising:

a roller pair configured to convey the sheet on which the image is formed, and discharge at least a part of the sheet to the outside of the image forming apparatus;

an upper guide unit fixed to the image forming apparatus and configured to guide an upper surface of the sheet discharged by the roller pair;

a stack unit provided at a position recessed from an upper exterior unit of the image forming apparatus, the discharged sheet being stacked on the stack unit; and an operation unit including a display unit configured to display information regarding image forming processing, the operation unit being attached to the upper exterior unit of the image forming apparatus, the operation unit being configured to operate the image forming apparatus, wherein the upper guide unit extends, along a discharge direction of the sheet discharged by the roller pair, more to a downstream side in the discharge direction than the roller pair, wherein the operation unit and the upper guide unit each have a portion overlapping with each other when viewed in a vertical direction, and wherein, when viewed in an axial direction of the roller pair, the operation unit and the upper guide unit are arranged at positions through which a straight line that is orthogonal to a plane passing through axes of rollers of the roller pair and that passes through a nip portion of the roller pair passes.

2. The image forming apparatus according to claim 1, wherein the operation unit operates the image forming apparatus in response to a touch on the display unit.

3. The image forming apparatus according to claim 1, wherein the operation unit is located inside a side surface of the image forming apparatus in a width direction of the sheet intersecting the discharge direction, and located closer to the roller pair in the discharge direction than a center of the image forming apparatus.

4. The image forming apparatus according to claim 1, wherein the operation unit is held by a hold unit located in the upper exterior unit, and the operation unit is held to be rotatable about a rotation center portion with respect to the hold unit.

5. The image forming apparatus according to claim 1, wherein the operation unit and the stack unit each have a portion overlapping with each other when viewed in the vertical direction.

6. The image forming apparatus according to claim 1, further comprising a lower guide unit configured to guide a lower surface of the sheet discharged by the roller pair.

7. The image forming apparatus according to claim 6, wherein, when viewed in the axial direction of the roller pair, a straight line passing through a lower guide unit distal end being a contact point between the lower guide unit and the sheet and an upper guide unit distal end being a most downstream portion of the upper guide unit in the discharge direction does not pass through the operation unit.

8. The image forming apparatus according to claim 1, wherein a distance by which the upper guide unit extends along the discharge direction of the sheet is different in a width direction of the sheet intersecting the discharge direction of the sheet, and the distance at an end in the width direction of the sheet is longer than the distance at a center of the stack unit.

9. The image forming apparatus according to claim 1, wherein the roller pair is a reversal roller pair configured to discharge a part of the sheet to the outside of the image forming apparatus and then convey the sheet to inside of the image forming apparatus.

10. The image forming apparatus according to claim 1, further comprising a detection unit configured to detect an amount of sheets stacked on the stack unit, wherein the detection unit is located below the upper guide unit in the vertical direction, and wherein a distal end of the detection unit on the downstream side in the discharge direction of the sheet is located on an upstream side in the discharge direction of the sheet, with respect to a guide unit distal end being a most downstream portion of the upper guide unit in the discharge direction of the sheet.

11. The image forming apparatus according to claim 10, wherein the detection unit does not come into contact with the upper guide unit when the amount of sheets stacked on the stack unit is at maximum.

* * * * *